United States Patent
Takahashi et al.

(10) Patent No.: US 7,182,974 B2
(45) Date of Patent: Feb. 27, 2007

(54) MAGNETIC RECORDING MEDIUM AND ITS MANUFACTURING METHOD AND MAGNETIC RECORDING SYSTEM USING SUCH A MAGNETIC RECORDING MEDIUM

(75) Inventors: Yoshio Takahashi, Koganei (JP); Kiwamu Tanahashi, Kokubunji (JP); Yuzuru Hosoe, Hino (JP); Ichiro Tamai, Hachioji (JP)

(73) Assignee: Hitachi Global Storage Technologies Japan, Ltd., Kanagawa-Ken (JP)

( * ) Notice: Subject to any disclaimer, the term of this patent is extended or adjusted under 35 U.S.C. 154(b) by 102 days.

(21) Appl. No.: 10/774,371

(22) Filed: Feb. 10, 2004

(65) Prior Publication Data

US 2004/0157083 A1    Aug. 12, 2004

Related U.S. Application Data

(62) Division of application No. 10/078,399, filed on Feb. 21, 2002, now Pat. No. 6,709,768.

(30) Foreign Application Priority Data

Nov. 29, 2001 (JP) .............................. 2001-363565

(51) Int. Cl.
  *B05D 5/12* (2006.01)
(52) U.S. Cl. ...................... 427/127; 427/128; 427/130; 427/131; 427/132; 428/611
(58) Field of Classification Search ................ 427/127, 427/128, 130, 131, 132; 428/611
See application file for complete search history.

(56) References Cited

U.S. PATENT DOCUMENTS 5,738,927 A    4/1998 Nakamura et al.

(Continued)

FOREIGN PATENT DOCUMENTS

JP         10-269548         10/1998

OTHER PUBLICATIONS

Journal of Magnetism and Magnetic Materials, 152 (1996), "Effects of Pt addition on the magnetic and crystallographic properties of Co-Cr-Pt thin-film media", A. Ishikawa et al, pp. 265-273.

(Continued)

*Primary Examiner*—Alain L. Bashore
(74) *Attorney, Agent, or Firm*—Mattingly, Stanger, Malur & Brundidge, P.C.

(57) ABSTRACT

A magnetic recording medium having a high coercive force and being capable of high-density writing/reading has a substrate, a soft magnetic layer, a non-magnetic intermediate layer, a magnetic layer, a protective layer, and a lubricating layer. The magnetic layer is characterized by stacking fault density and dispersion of particle diameters. The stacking fault density should preferably be no larger than 0.05, and the dispersion of particle diameters should preferably be no larger than 0.4. The magnetic recording medium has a coercive force larger than 4000 Oe, is highly stable to thermal decay, and has a recording density in excess of 50 Gbit/in$^2$.

3 Claims, 7 Drawing Sheets

U.S. PATENT DOCUMENTS

| | | |
|---|---|---|
| 5,815,343 A | 9/1998 | Ishikawa et al. |
| 5,939,202 A | 8/1999 | Ataka et al. |
| 6,080,476 A | 6/2000 | Kanbe et al. |
| 6,168,861 B1 | 1/2001 | Chen et al. |
| 6,432,563 B1 * | 8/2002 | Zou et al. .................. 428/826 |

OTHER PUBLICATIONS

Nakatani, Y. and Hayashi, N., IEEE Trans. Mag., 34(4), 1998, 1618-1620.

Ikeda, Y., Sonobe, Y., Zeltzer, G., Yen, B., Takano, K., Do H., Fullerton, E., and Rice, P., IEEE Trans. Mag., 37(4), 2001, 1583, 1585.

Lu, B., Klemmer, T., Khizroev, S., Howard, J., Litvinov, D., Roy, A., and Laughlin, D., IEEE Trans. Mag., 37(4), 2001, 1319-1321.

Yamanaka, K., Hamamoto, T., Nakano, Y. and Miura, M., IEEE Trans. Mag., 37(4), 2001, 1599-1601.

Futamoto, M., Honda, Y., Hirayama, Y., Itoh, K., Ide, H., and Maruyama, Y., IEEE Trans. Mag., 32(5), 1996, 3789-3794.

* cited by examiner hcp STACKING ((110) PLANE)

STACKING WITH STACKING FAULT

TEMPERATURE FOR FILM FABRICATION 214°C

TEMPERATURE FOR FILM FABRICATION 330°C

MAGNETIC RECORDING MEDIUM AND ITS MANUFACTURING METHOD AND MAGNETIC RECORDING SYSTEM USING SUCH A MAGNETIC RECORDING MEDIUM

This is a divisional application of U.S. Ser. No. 10/078,399, filed Feb. 21, 2002 now U.S. Pat. No. 6,709,768.

BACKGROUND OF THE INVENTION

1. Field of the Invention

The present invention relates to a perpendicular magnetic recording medium, a process of production thereof, and a magnetic storage equipped therewith. The perpendicular magnetic recording medium has a magnetic layer composed of columnar magnetic crystal grains whose principal component is cobalt, and it is characterized by reduced thermal decay. The magnetic storage has a recording density in excess of 50 Gbit/in$^2$.

2. Description of the Related Arts

There is an increasing demand for higher recording density in magnetic storage from the standpoint of increasing the storage capacity, miniaturizing the apparatus, and reducing the number of parts. The existing magnetic recording medium is based on longitudinal magnetic recording. It records information by means of mutually opposed domains (recording bits) which are magnetized in the direction parallel to the surface of the substrate. For a longitudinal magnetic recording medium to be capable of high-density recording, it should have a low noise level. One effective way of noise reduction is finely reducing in size of crystal grains and even out particle diameters (or reduce the dispersion of particle diameters). This is exemplified by the invention (disclosed in Japanese Patent Laid-open No. 269548/1998) relating to a longitudinal recording medium which specifies for noise reduction the optimum particle diameter and the optimum dispersion of particle diameters.

Increasing the recording density in longitudinal magnetic recording will have a limit because of the necessity for more finely reduced crystal grains than before. However, extremely small crystal grains encounter problems with thermal decay. In other words, their magnetization for recording is decayed by even such small thermal energy as generated at room temperature. In order to address the problem with thermal decay, there has been proposed the perpendicular magnetic recording system, which is attracting great attention. It is essentially suitable for high-density recording by virtue of its property that the thermal stability of magnetization improves as the recording density increases.

The recording medium for perpendicular magnetization under wide study is one which has a magnetic layer composed of practically columnar crystal grains, with their (00.1) plane oriented nearly parallel to the surface of the substrate for their magnetic anisotropy in the direction perpendicular to the substrate. The most widely studied recording medium with a CoCr alloy magnetic film has a coercive force of about 3000 Oe (equivalent to approximately 79.7 A/m in SI unit). In order to put to practical use the magnetic recording medium composed mainly of cobalt, the present inventors carried out extensive studies, which led to an important finding that a magnetic film of cobalt alloy with the c-axis (or the (00.1) direction) oriented perpendicular to the surface of the substrate has a stacking fault density which is two to three times higher than that of cobalt alloy magnetic film with longitudinal orientation.

The perpendicular magnetic recording also needs a magnetic recording medium with low noise and high thermal stability. No matter whether it is of longitudinal recording type or perpendicular recording type, the magnetic layer with many stacking faults will be poor in magnetic anisotropy, coercivity, and thermal stability. For high thermal stability of recording magnetization, it is necessary to reduce the stacking fault density in the magnetic film.

The major cause of stacking faults is ingression of a plane corresponding to the fcc-like structure into the hcp structure. It is believed that the stacking fault density will decrease if the magnetic film is formed at a low temperature desirable for the hcp structure to be stable. However, the present inventors' elucidation suggests that the magnetic film formed at low temperatures decreases in stacking fault density but does not increase in coercive force because crystal grains constituting the magnetic film have a broad distribution of particle diameters. Raising the film-forming temperature to reduce the dispersion of particle diameters increases the stacking fault density, with coercivity remaining low.

The longitudinal magnetic recording medium is inherently little subject to stacking faults because crystal grains constituting the magnetic layer are epitaxially grown on the underlayer such that the c-axis of magnetic grain is longitudinally oriented. Epitaxial growth takes place in the direction toward the most stable energy state. Thus, there is almost no possibility that epitaxial growth brings about an unstable energy state due to ingression of a crystal phase different from that of the fcc structure.

It was found from the present inventors' investigation that the stacking fault density in the longitudinal magnetic recording medium formed at about 250° C. is one half to one-third of that in the perpendicular magnetic recording medium. It was also found that the dispersion of particle diameters in the longitudinal magnetic recording medium is about 0.3 to 0.4, which is determined almost entirely by the dispersion of particle diameters in the underlying film of chromium alloy and which does not depend on the film-forming temperature.

The film-forming temperature affects the stacking fault density and the dispersion of particle diameters as shown in FIGS. 1 and 2 respectively. It is to be noted from FIG. 1 that the stacking fault density decreases as the film-forming temperature decreases. It is also to be noted from FIG. 2 that the dispersion of particle diameters increases as the film-forming temperature decreases. This suggests that it is difficult to have both of a low stacking fault density and a low dispersion of particle diameters. Such an antinomic relation of the film-forming temperature with the stacking fault density and the dispersion of particle diameters has never been anticipated in the technology of longitudinal magnetic recording medium.

OBJECT AND SUMMARY OF THE INVENTION

It is an object of the present invention to provide a perpendicular magnetic recording medium which is made of conventional CoCr alloy as a magnetic material and yet has good thermal stability owing to adequate control over the stacking fault density and the dispersion of particle diameters. Being made of a conventional magnetic material, the recording medium is economically advantageous.

It is another object of the present invention to provide a method of adequately controlling the stacking fault density and the dispersion of particle diameters.

The objects of the present are achieved by controlling the stacking fault density (R) and the dispersion of particle diameters ($\Delta D/\langle D\rangle$) of the magnetic film, which is composed of magnetic crystal grains whose principal component is cobalt, such that the product of $\Delta D/\langle D\rangle \times R$ is no larger than 0.02.

The stacking fault density relates with coercive force as shown in FIG. 3. Incidentally, dotted lines in FIG. 3 are contour lines for some values of the dispersion of particle diameters which are determined by the coercive force and the stacking fault density. It is noted from FIG. 3 that the coercive force increases as the stacking fault density decreases and the coercive force slightly decreases as the stacking fault density decreases further (due to increase in the dispersion of particle diameters).

FIG. 4 shows the contour lines of coercive force which are determined by the stacking fault density and the dispersion of particle diameters. It is noted that the coercive force no smaller than 4000 Oe is obtained in the area (under the thick line) in which the product of the stacking fault density and the dispersion of particle diameters is no larger than 0.02. The coercive force of 4000 Oe is necessary to suppress thermal decay. With a value of coercive force no smaller than 4000 Oe, the magnetic recording medium has a value of Ku·V/k·T no smaller than 60 which is necessary to ensure thermal stability for recording magnetization. This value is a parameter to indicate resistance to thermal decay. (In Ku·V/k·T, Ku denotes a magnetic anisotropy energy possessed by crystal grains, V denotes a volume of crystal grains, k denotes the Boltzmann constant, and T denotes an absolute temperature.) According to the present invention, this parameter Ku·V/k·T should have a value no smaller than 60; otherwise, the magnetic recording medium is not of practical use because it remarkably decreases in the amount of recorded magnetization. To achieve this object, the magnetic recording medium should have a coercive force no smaller than 4000 Oe in view of the fact that the existing cobalt-based magnetic material has a value of about 0.38 T (tesla) for saturation magnetization and the magnetic layer has a thickness of 18 nm and the magnetic crystal grains have an average particle diameter of about 12 nm (both attainable by the present technology).

One way to decrease both the stacking fault density and the dispersion of particle diameters is to form the magnetic film at a temperature no lower than about 250° C. and then anneal the resulting magnetic film. Film forming at a high temperature increases the stacking fault density, but annealing decreases the stacking fault density.

The following is a probable reason why the stacking fault density is decreased by annealing. The magnetic film, which is formed usually by sputtering, is subject to stacking faults because sputtering, which is a non-equilibrium process, does not permit atoms constituting the magnetic film to diffuse completely into the film. In other words, sputtering fails to arrange atoms at energy-stable positions (or hcp lattices) but results in stacking faults. Annealing after film formation moves atoms to the hcp lattice positions.

The present invention is also directed to a magnetic recording/reading unit which is constructed of the above-mentioned magnetic recording medium, a drive mechanism to convey the recording medium, and a magnetic head for record writing/reading, which is a component capable of producing a high magneto-resistive effect. The magnetic recording/reading unit has a recording density in excess of 50 Gbit/in$^2$. The magnetic head should preferably be one which utilizes the giant magneto-resistive effect, spin-valve effect, or tunneling magneto-resistive effect.

DESCRIPTION OF THE PREFERRED EMBODIMENTS

The embodiments of the present invention are described below with reference to the accompanying drawings.

To start with, let us define the stacking fault density and the dispersion of particle diameters as follows.

Figure 5A:
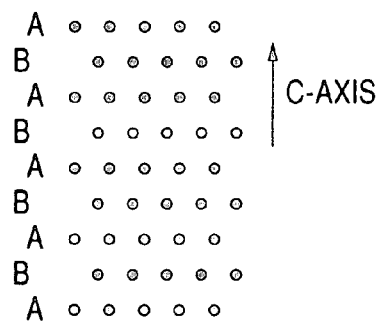
FIG. 5 is a schematic diagram illustrating how to calculate the stacking fault density.
Figure 5B:
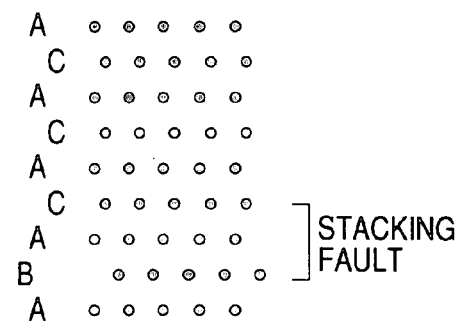

In the examples of the present invention, the stacking fault density is obtained from the image of the sectional structure of a sample of the magnetic film. The sectional structure is perpendicular to the surface of the substrate, and the image is taken by a transmission electron microscope. Microscopic observation is carried out to give an image of crystal structure, with the object aperture and the defocus amount adequately controlled. The image of sectional structure thus obtained is scrutinized to select the particle on which the (11.0) plane is apparently visible. Layers having the (00.2) plane in the selected particle are sequentially examined, starting from the one adjacent to the surface of the substrate. The number of planes not assuming the hcp structure is counted. The plane not assuming the hcp structure is defined as shown in FIG. 5. The hcp structure consists of identical layers stacked one over the other in the c-axis direction. If each equivalent layer is designated as A and B, the layer structure may be delineated as A,B,A,B,A,B, . . . However, the layer structure with stacking faults may be delineated as A,B,A,C,A,C, . . . , for example, where C denotes a third equivalent layer. The middle portion indicated by B,A,C constitutes the stacking fault, and it is the plane not assuming the hcp structure. This portion is counted as one plane with stacking fault. The latter half portion indicated by C,A,C assumes the hcp structure, and hence it does not constitute the stacking fault. The number of planes with stacking faults divided by the total number of the (00.2) plane in the selected particle is then defined as the stacking fault density on the selected particle. The same measurement as above is repeated for a plurality of particles. The average of the results is the stacking fault density of the magnetic film of a given sample.

Figure 6A:
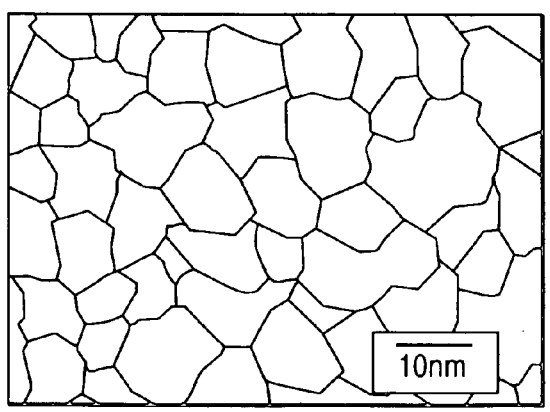
FIG. 6 is a schematic diagram illustrating how to calculate the dispersion of particle diameters.
Figure 6B:
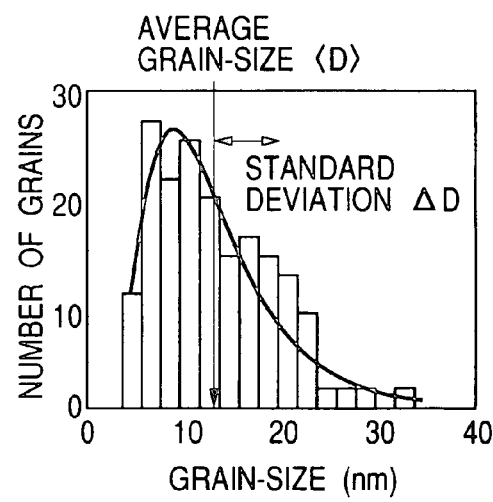

The dispersion of particle diameters is also calculated from an image taken by a transmission electron microscope as follows. First, a plan view image of the magnetic film is observed with a transmission electron microscope, and crystal lattice image observed from the direction perpendicular to the surface of the substrate are photographed. The map of the grain boundary produced from the lattice image thus obtained is schematically shown in FIG. 6. The map of the grain boundary is scanned so as to count the number of pixels present within the boundary of one crystal grain. The number of pixels multiplied by the scale for conversion into area gives the area of one crystal grain. The diameter of the circle having the same area as the obtained grain area is regarded as the particle diameter of the crystal grain. This calculation is performed on about 300 crystal grains. The average of the particle diameters thus obtained is designated as average particle diameter <D>. Also, the standard deviation of the average particle diameter is calculated. It is designated as ΔD. The standard deviation is divided by the average particle diameter to give the dispersion of particle diameters, which is designated as ΔD/<D>.

EXAMPLE 1

Figure 8:
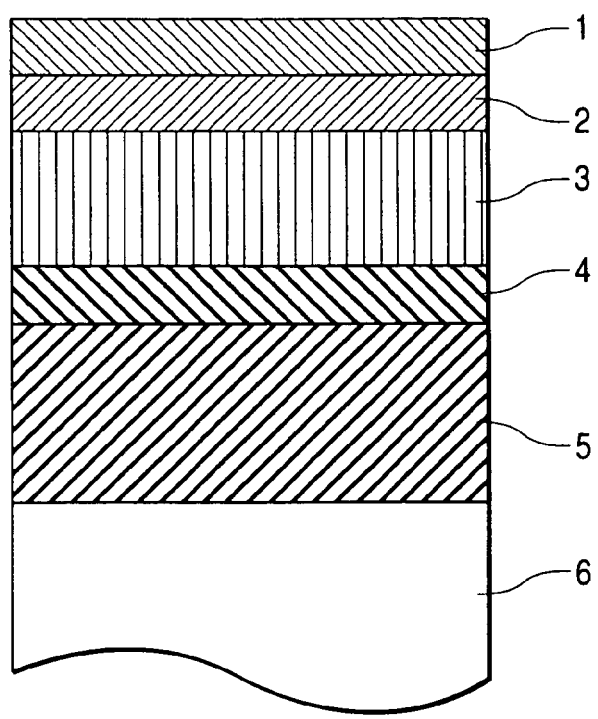
FIG. 8 is a schematic diagram showing the cross-section of the magnetic recording medium pertaining to the present invention.

This example demonstrates a perpendicular magnetic recording medium, whose schematic sectional view is shown in FIG. 8. The perpendicular magnetic recording medium is composed of a substrate 6, a soft magnetic layer 5, a non-magnetic intermediate layer 4, a cobalt alloy magnetic layer 3, a protective layer 2, and a lubricating layer 1, which are arranged one over another. Incidentally, there is interposed a NiTaZr film between the substrate 6 and the soft magnetic layer 5 for better adhesion between them. The substrate 6 may be formed from chemically strengthened glass, crystallized glass, amorphous carbon, Al—Mg alloy (with NiP plating), or the like.

Each layer was formed on the crystallized glass substrate 6 by magnetron sputtering. First, on the substrate 6 was formed an intermediate layer (30 nm thick) from NiTa(37.5)Zr(10), which is composed of 52.7 at % Ni, 37.5 at % Ta, and 10 at % Zr. (This notation is used hereinafter.)

Then, the soft magnetic layer 5 (400 nm thick) was formed from FeTa(10)C(16). Other soft magnetic materials include FeTaC, FeTaN, and CoTaZr. The soft magnetic layer may be formed with its direction of magnetization fixed, or it may also be formed in combination with one or more layers which control crystalline characteristics.

Figure 2:
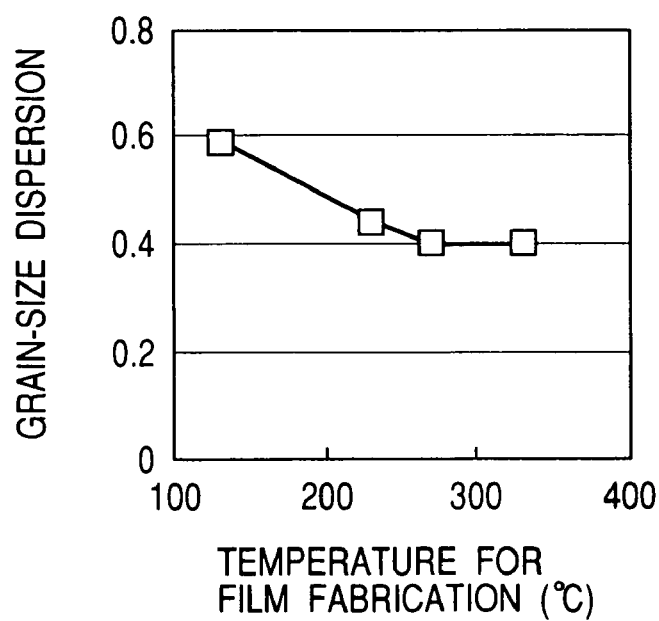
FIG. 2 is a diagram showing the relation between the dispersion of particle diameters and the film-forming temperature in the conventional technology.

The surface of the soft magnetic layer 5 was heated to 330° C. by using an infrared lamp so that the substrate acquired a temperature high enough for film forming. The non-magnetic intermediate layer 4, the magnetic layer 3, and the protective film 2 were formed sequentially. If the temperature of the substrate is not higher than 250° C., the dispersion of particle diameters would be larger 0.4 as shown in FIG. 2. Such a condition should be avoided.

The non-magnetic intermediate layer 4 is a laminate consisting of a 4-nm thick film of NiTa(37.5)Zr(10) and a 1-nm thick film of CoCr(40). The former film permits the latter's c-axis to orient in the perpendicular direction and also makes the latter's crystal grains fine. The effect is that the magnetic layer formed on the CoCr film is composed of fine crystal grains.

Incidentally, the above-mentioned non-magnetic intermediate layer 4 (in laminate form) may be replaced by a single non-magnetic film of NiTa, NiTaZr, CoCr, CoCrB, CoB, CoRu, TiCr, or the like.

On the CoCr film was formed by sputtering the magnetic layer 3 which is a 18-nm thick film of CoCr(19)Pt(14). Sputtering was carried out at an argon pressure of 0.5 Pa and a film-forming rate of 7.8 nm. The maximum degree of vacuum that was attained by the sputtering chamber was 5 μPa. The protective layer 2 has a thickness of 5 nm. The sample for performance evaluation was given the lubricating layer 1.

The raw material for the magnetic layer 3 may include, in addition to the above-mentioned CoCr(19)Pt(14), CoCrPt alloys and CoCrPt alloys incorporated with one or more elements such as Ta, B, Nb, and Cu. Their examples are CoCr(19)Pt(14), CoCr(22)Pt(14), and CoCr(17)Pt(14)B(4). Chromium in the magnetic film segregates more in grain boundaries than in grain interior, thereby lowering magnetic coupling between grains. Platinum enhances the magnetic anisotropy of crystal grains. The additional elements reduce the crystal particle diameter and lower magnetic coupling between adjacent particles.

The thus formed magnetic film was heated at 370° C. for 12 seconds by means of an infrared lamp.

The sample was allowed to stand for 120 seconds in the evacuated chamber. Then, on the magnetic film was formed the protective layer 2 from carbon or a carbonaceous material containing H or N. The protective layer 2 is usually 2–5 nm thick. The protective layer 2 was further coated with the lubricating layer 1 (2–10 nm thick) of perfluoroalkyl polyether. Thus, there was obtained a highly reliable magnetic recording medium.

For comparison of magnetic characteristics, comparative samples of magnetic recording medium were prepared in the same way as mentioned above, except that annealing by an infrared lamp was not performed or the stacking fault density was varied by adjusting the film-forming temperature.

Figure 9:
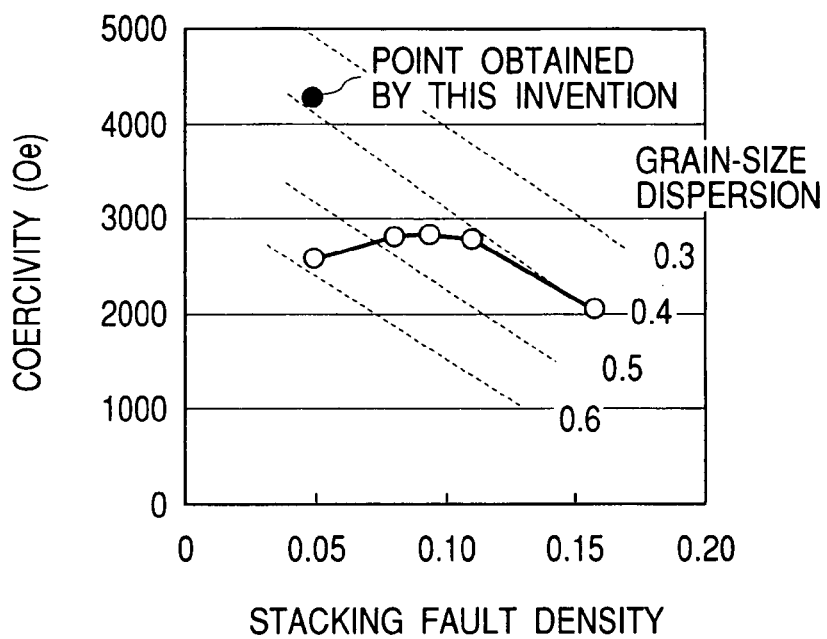
FIG. 9 is a diagram showing the relation among the stacking fault density, the dispersion of particle diameters, and the coercive force in Example 1 of the present invention.

FIG. 9 shows a comparison between the sample in this example and the comparative sample. It is to be noted that the sample in this example has a stacking fault density of 0.048 and a dispersion of particle diameters of 0.40, both measured according to the above-mentioned method. These values are remarkably lower than those of the comparative examples. The sample in this example was tested for magnetostatic properties by using a vibrating sample magnetometer. It was found to have a coercive force of 4300 Oe and a squareness of 0.97, which are highly desirable values. This result suggests that the sample has a coercive force higher than 4000 Oe owing to its stacking fault density lower than 0.05 and its dispersion of particle diameters smaller than 0.4.

Figure 11A:
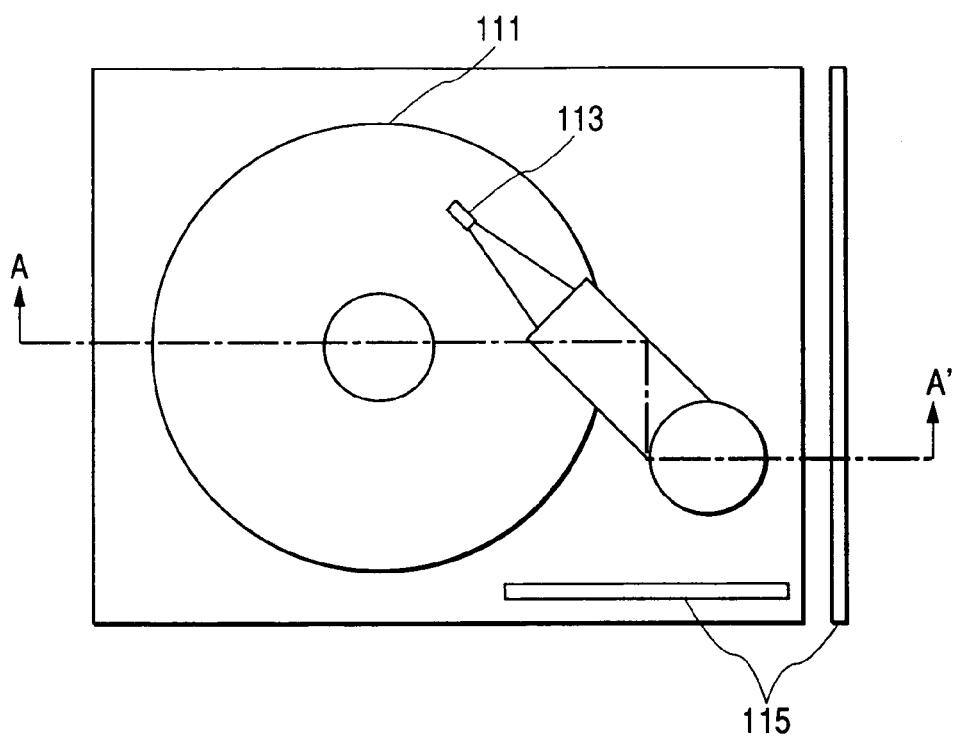
FIG. 11(a) is a plan view of the magnetic recording unit pertaining to the example of the present invention.
Figure 11B:
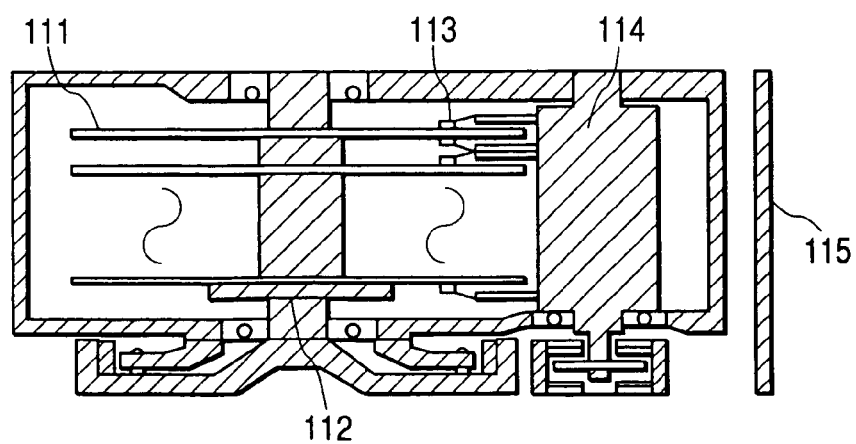
FIG. 11(b) is a sectional view (taken along line A–A') of the magnetic recording unit pertaining to the example of the present invention.
Figure 12:
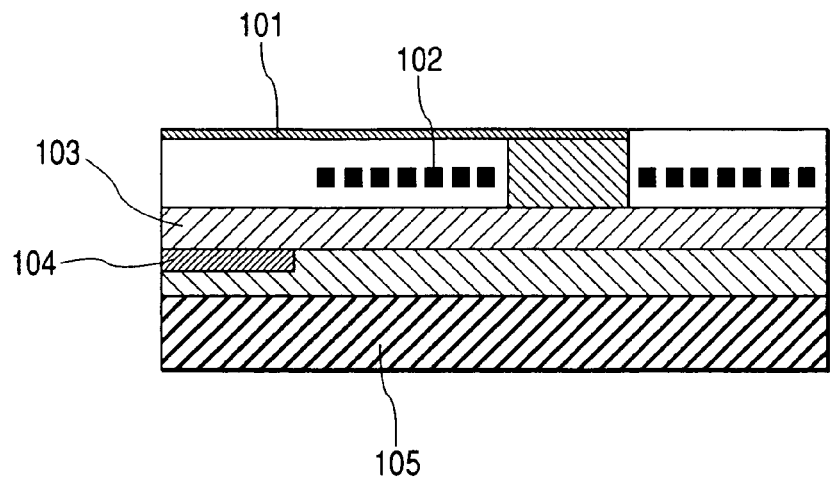
FIG. 12 is a schematic sectional view showing the magnetic head of write-read separate type.

The magnetic recording medium obtained in this example was mounted on a magnetic recording apparatus for evaluation of read/write characteristics. As shown in FIG. 11, this apparatus consists of a magnetic recoding medium 111 and a drive 112 therefor, a magnetic head 113 and a drive 114 therefor, and a means 115 to process write/read signals to and from the magnetic head. As shown in FIG. 12, the magnetic head 113 consists of a main magnetic pole 101, a recording coil 102, an upper shield 103 (which functions also as an auxiliary pole), a giant magneto-resistive element 104, and a lower shield 105. The magnetic head 113 is of write/read separate type, and it is formed on the magnetic head slider. The write unit, which is the single-pole type head, has a track width of 170 nm. The read unit has an effective track width of 124 nm. The shield space is 60 nm.

The write/read test was carried out under the following conditions.

Linear recording density: 769 kFCI (kilo flux change per inch)

Track pitch: 195 nm

Distance between the magnetic head and the magnetic recording medium: 15 nm

There was obtained an S/N ratio of 22.0 dB. This value is high enough for the magnetic recording medium to have a recording density in excess of 50 Gbit/in$^2$.

Then, the sample was examined for thermal stability which is crucial for high-density recording. This object was achieved by measuring the rate of decrease of the read output with time. This parameter is defined as a ratio of the difference between the read output measured immediately after recording and the read output measured after standing for a certain period to the read output measured immediately after recording. The rate of decrease was 2% when the read output was measured 100 hours after recording with a linear recording density of 100 kFCI. This suggests that the sample will retain recorded data for a long period of time. The sample was also tested for the dependence of residual coercivity on the duration of magnetic field application. This test gave a value of Ku·V/k·T no smaller than 60. This result suggests that the sample has good thermal stability.

EXAMPLE 2

The same procedure as in Example 1 was repeated except that annealing was carried out at a lower temperature and for a longer time. The resulting sample was tested for magnetic characteristics. There is an instance where annealing is performed on a number of magnetic recording media. In practice, however, it is usually impossible to hold all of them in a sputtering vacuum chamber with a limited capacity. So, it is necessary to remove them out of a vacuum chamber. This is the reason why the magnetic recording medium needs a protective film for protection from oxidation. The protective film should preferably be made of a carbonaceous material. To prevent carbon in the protective film from diffusing into the magnetic film, it is necessary not to heat the magnetic medium above 250° C.

The sample of the magnetic recording medium in this example is somewhat similar in structure to that in Example 1. It is composed of the following layers.

Intermediate layer: a laminate composed of a 2-nm thick film of NiTa(37.5)Zr(10) and a 3-nm thick film of CoCr(40).

Magnetic film (20-nm thick) of CoCr(17)Pt(14)B(4).

Protective film (5-nm thick) of carbon.

After film formation, the sample was allowed to cool for 8 hours in a constant temperature oven at 220° C.

A comparative sample of magnetic recording medium was prepared in the same way as in Example 1, except that annealing was not performed.

Figure 10:
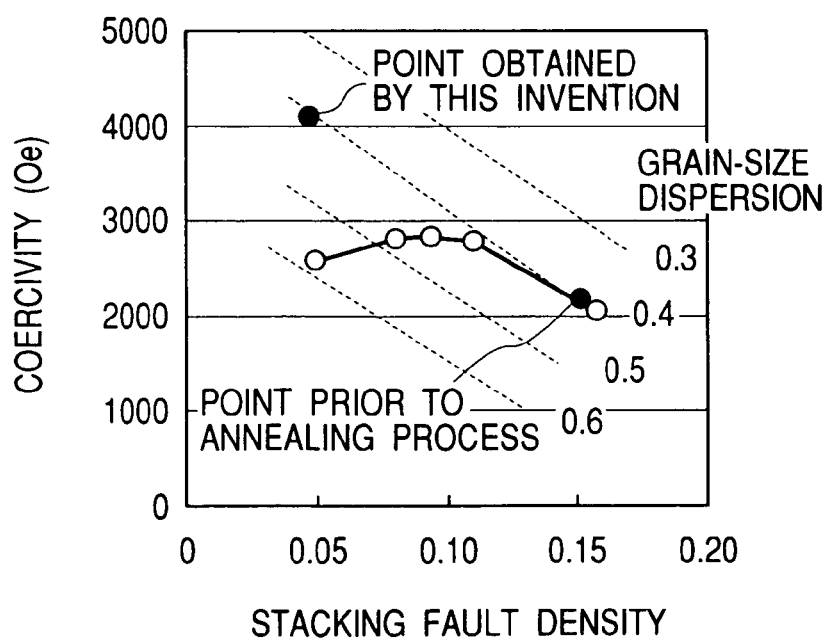
FIG. 10 is a diagram showing the relation among the stacking fault density, the dispersion of particle diameters, and the coercive force in Example 2 of the present invention.

FIG. 10 shows a comparison between the sample in this example and the comparative sample. It is to be noted that the sample in this example has a stacking fault density of 0.050 and a dispersion of particle diameters of 0.39, both measured according to the above-mentioned method. These values are remarkably lower than those of the comparative example. The sample in this example was tested for magnetostatic properties by using a vibrating sample magnetometer. It was found to have a coercive force of 4000 Oe and a squareness of 0.90, which are highly desirable values. Incidentally, the sample in this example was examined by a transmission electron microscope before its annealing (for 8 hours in a constant temperature oven). It was found to have a stacking fault density of 0.15 and a dispersion of particle diameters of 0.39. This result indicates that annealing for an extended time at a comparatively low temperature greatly reduces the stacking fault density without changing the dispersion of particle diameters. The sample in this example has a stacking fault density lower than 0.05 and a dispersion of particle diameters lower than 0.4, and hence it has a coercive force higher than 4000 Oe.

The magnetic recording medium obtained in this example was mounted on a magnetic recording apparatus (shown in FIG. 11) for evaluation of read/write characteristics. The write unit, which is the single-pole type head, has a track width of 170 nm. The read unit has an effective track width of 124 nm and a shield space of 60 nm. The read unit employs a giant magneto-resistive element. The write/read test was carried out under the following conditions.

Linear recording density: 769 kFCI

Track pitch: 195 nm

Distance between the magnetic head and the magnetic recording medium: 15 nm

There was obtained an S/N ratio of 20.3 dB. This value is high enough for the magnetic recording medium to have a recording density in excess of 50 Gbit/in$^2$.

Then, the sample was examined for the rate of decrease of the read output with time. The rate of decrease was 2% when the read output was measured 100 hours after recording with a linear recording density of 100 kFCI. This suggests that the sample will retain recorded data for a long period of time.

EXAMPLE 3

Figure 3:
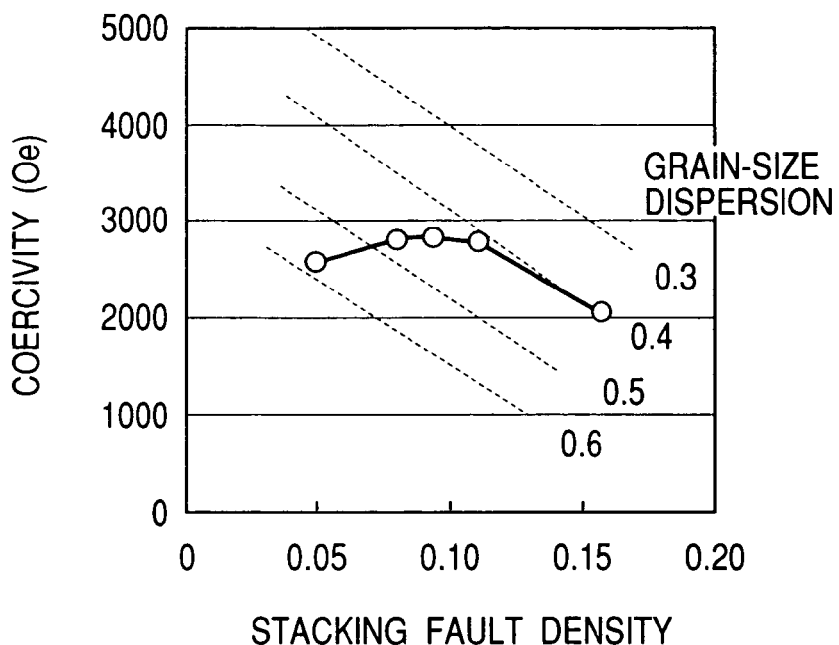
FIG. 3 is a diagram showing the relation among the stacking fault density, the dispersion of particle diameters, and the coercive force in the conventional technology.
Figure 4:
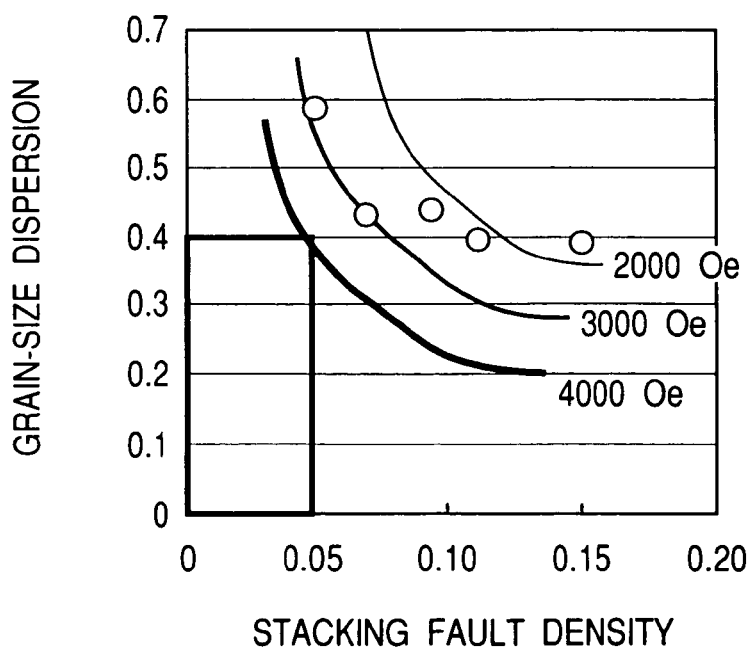
FIG. 4 is a diagram showing the relation among the stacking fault density, the dispersion of particle diameters, and the coercive force in the conventional technology.

This example demonstrates the effect that is produced by controlling the dispersion of angles of c-axis. One effective way to reduce the dispersion of particle diameters is to increase the dispersion of angles of c-axis of the columnar crystal grains constituting the magnetic film. The dispersion of angles of c-axis is defined as the full width at half maximum of the dispersion of the angles which the (00.1) plane makes with the surface of the substrate. It is considered that the crystal grains constituting the magnetic film grow from the nuclei which have been randomly generated during sputtering. If those crystal grains which have grown from such nuclei become independent crystal grains, then the dispersion of particle diameters should be about 0.28 according to simulation with Voronoi figure. However, practical crystal growth takes place such that adjoining particles coalesce into a single particle. This is true particularly with crystal grains with a small dispersion of angles of c-axis. Crystals with six symmetries (as viewed in the direction perpendicular to the film surface) tend to form coalesced crystal grains because there is a high possibility that the crystal plane orientation of one crystal coincides with that of its adjacent crystal. The result is that the dispersion of particle diameters does not decrease as shown in FIG. 3 even though the substrate temperature is raised. Incidentally, this is not the case with longitudinal magnetic recording media in which the c-axis is oriented in the longitudinal direction and hence there is a low possibility of adjoining grains coalescing. Thus the dispersion of particle diameters is about 0.3. By contrast, in the case of magnetic recording medium with c-axis oriented in the perpendicular direction, the orientation of the c-plane (as viewed in the direction parallel to the film surface) hardly coincides with that of adjoining crystals (or adjoining grains hardly coalesce) if the crystal grains are grown on a highly irregular surface. In other words, under such conditions the formation of large particles will be suppressed and the dispersion of particle diameters will approach 0.28.

Figure 7:
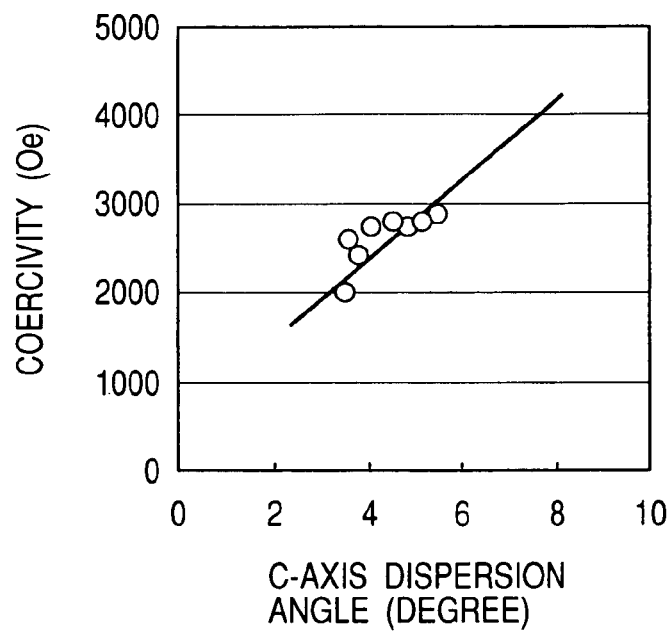
FIG. 7 is a diagram showing the relation between the coercive force and the variation of angles of the c-axis in the conventional technology.

FIG. 7 shows the relation between the coercive force and the dispersion of angles of c-axis in the conventional technology. It is noted that if the dispersion of angles of c-axis is smaller than 6 degrees, the coercive force is 3000 Oe at the highest.

The dispersion of angles of c-axis is measured in the following manner by using an X-ray diffractometer ($\theta$–$2\theta$ method). First, the diffraction peak due to the (00.2) plane is detected by changing the incident angle ($\theta$) of X-rays. With the incident angle of X-rays fixed for the thus obtained diffraction peak, the specimen is tilted and the intensity of X-rays detected at different tilting angles is plotted. Thus, there is obtained a rocking curve showing the distribution of peak intensities. The full width at half maximum of the curve is regarded as the dispersion of angles of c-axis.

In this example, the magnetic recording medium has a soft magnetic film of FeTa(10)C(6), a non-magnetic intermediate laminate layer consisting of a 2-nm thick film of NiTa(37.5)Zr(10) and a 3-nm thick film of CoCr(40), a 18-nm thick magnetic film of CoCr(19)Pt(14), and a 5-nm thick protective film of carbon. The soft magnetic film of FeTa(10)C(6) was heated at 250° C. by an infrared lamp after its formation. The non-magnetic film of NiTa(37.5)Zr(10) was formed by magnetron sputtering with argon at a pressure of 3.5 Pa. The argon pressure was kept rather high so as to roughen the surface of the film of NiTa(37.5)Zr(10). The reason for this as follows. It has been known from cross sectional TEM observation that crystal grains constituting the magnetic film epitaxially grow on the film of CoCr(40). However, it is considered that the dispersion of angles of c-axis in the magnetic film depends on the film of CoCr(40). When formed by the conventional technology, the film of CoCr(40) has a dispersion of angles of c-axis smaller than about 5 degrees as shown in FIG. 7, whereas when formed on the film of NiTa(37.5)Zr(10) with its surface roughened, the film of CoCr(40) has a dispersion of angles of c-axis larger than about 5 degrees. As the dispersion of angles of c-axis increases, there is a lower possibility of adjoining grains coalescing, which leads to a reduced dispersion of particle diameters.

On examination of the rocking curve obtained from X-ray diffractometry, the magnetic recoding medium in this example was found to have a dispersion of angles of c-axis of 8 degrees. It was also found to have a coercive force of 4100 Oe and a squareness ratio of 0.90.

Figure 1:
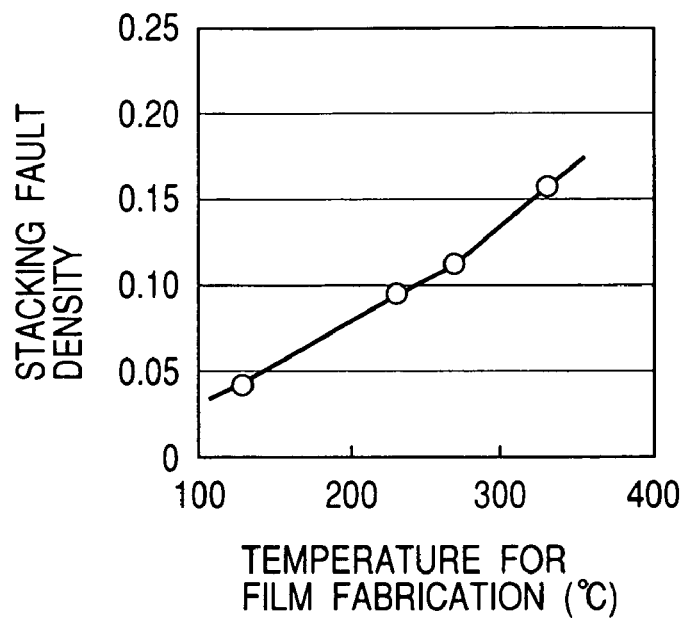
FIG. 1 is a diagram showing the relation between the stacking fault density and the film-forming temperature in the conventional technology.

After its test for magnetostatic characteristics, the magnetic layer was observed under a transmission electron microscope to examine the crystalline structure on its surface and cross-section. It was found that the stacking fault density is 0.070 and the dispersion of particle diameters is 0.28. A probable reason why the stacking fault density is higher than 0.05 is that the magnetic layer was not annealed after it had been formed. Yet, the stacking fault density is still higher than about 0.11 which is obtained from FIG. 1 showing how the stacking fault density depends on the film-forming temperature. A probable reason for this is that the intermediate layer of CoCr(40) stabilizes the crystalline structure in the early stage of crystal growth of the magnetic film, thereby suppressing the stacking faults. The magnetic recording medium in this example was found to have the stacking fault density and the dispersion of particle diameters such that their product is smaller than 0.02. It was also found to have a coercive force as high as 4000 Oe. Incidentally, a comparative sample having an intermediate layer of CoCr(40) without annealing for reduction in the dispersion of particle diameters has a coercive force of 3500 Oe, but it does not have a sufficient coercive force in excess of 4000 Oe.

The magnetic recording medium obtained in this example was mounted on a magnetic recording apparatus (shown in FIG. 11) for evaluation of read/write characteristics. The write unit, which is the single-pole type head, has a track width of 170 nm. The read unit has an effective track width of 124 nm and a shield space of 60 nm. The read unit employs a giant magneto-resistive element. The write/read test was carried out under the following conditions.

Linear recording density: 769 kFCI
Track pitch: 195 nm
Distance between the magnetic head and the magnetic recording medium: 15 nm There was obtained an S/N ratio of 21.4 dB. This value is high enough for the magnetic recording medium to have a recording density in excess of 50 Gbit/in$^2$.

Then, the sample was examined for the rate of decrease of the read output with time. The rate of decrease was 2% when the read output was measured 100 hours after recording with a linear recording density of 100 kFCI. This suggests that the sample will retain recorded data for a long period of time.

EXAMPLE 4

This example demonstrates the effect which is produced by reducing the amount of platinum. The sample of the magnetic recording medium in this example has a soft magnetic film of FeTa(10)C(6), a 5-nm thick intermediate film of NiTa(37.5)Zr(10), a 6-nm thick film of CoCr(17)Pt(8) (as a first magnetic layer), a 12-nm thick film of CoCr(19)Pt(16) (as a second magnetic layer), and a protective carbon layer. The total thickness of the magnetic layer is 18 nm. The soft magnetic film of FeTa(10)C(6) was heated at 250° C. by an infrared lamp after its formation.

The sample was tested for magnetostatic characteristics by using a vibrating sample magnetometer. It was found to have a coercive force of 4000 Oe and a squareness ratio of 1.0. After its test for magnetostatic characteristics, the magnetic layer was observed under a transmission electron microscope to examine the stacking fault density and the dispersion of particle diameters. It was found that the stacking fault density is 0.050 and the dispersion of particle diameters is 0.40. A probable reason for reduction in the stacking fault density is a decrease in the amount of platinum in the first magnetic layer. This will be explained below in more detail.

Figure 13A:
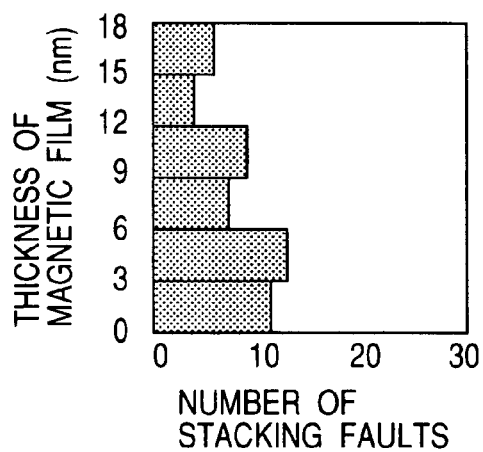
FIG. 13(a) is a histogram showing the distribution of stacking faults in the thickness direction of the magnetic film formed at 214° C.
Figure 13B:
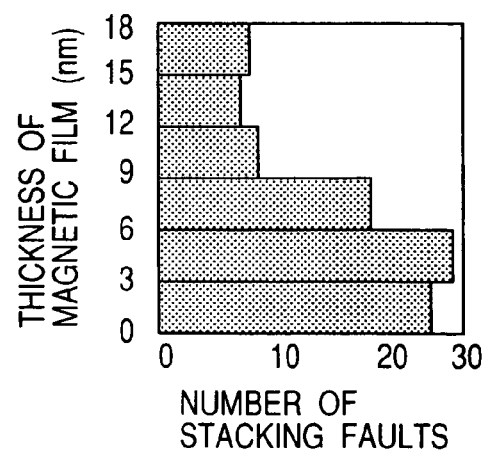
FIG. 13(b) is a histogram showing the distribution of stacking faults in the thickness direction of the magnetic film formed at 330° C.

The distribution of stacking faults in cross-section varies depending on the film-forming temperature (214° C. and 330° C.) as shown in FIG. 13 (with the ordinate representing the incremental thickness of film and the abscissa representing the number of stacking faults). It is noted that the stacking fault density increases in the early stage of crystal growth in the magnetic film regardless of the film-forming temperature. A possible cause for this is a stress that occurs in the interface between the magnetic film and the intermediate film.

In the meantime, Journal of Magnetism and Magnetic Materials, vol. 152 (1996) pp. 265–273, reports the magnetic anisotropy which occurs in a magnetic layer of CoPt alloy for longitudinal recording medium formed on the substrate. The reported data indicate that the magnetic anisotropy rapidly decreases as the amount of platinum in the CoCr alloy exceeds 12 at %. This suggests a steep increase of stacking faults in the magnetic layer. Therefore, it is considered that the upper limit of platinum to be added to the magnetic layer is 12 at %. Thus, in the case where the magnetic film is composed of two layers, the lower film should be formed such that the amount of platinum is less than 12 at %. In this way it would be possible to sufficiently decrease the stacking fault density in the initial stage of crystal growth. The low stacking fault density of the magnetic film in this example may be attributable to the laminate structure of two magnetic layers, the first layer containing a less amount of platinum for reduction of stacking faults and the second layer being isolated from the stress at the interface of the intermediate film.

The magnetic recording medium obtained in this example was mounted on a magnetic recording apparatus (shown in FIG. 11) for evaluation of read/write characteristics. The write unit, which is the single-pole type head, has a track width of 170 nm. The read unit has an effective track width of 124 nm and a shield space of 60 nm. The read unit employs a giant magneto-resistive element. The write/read test was carried out under the following conditions.

Linear recording density: 769 kFCI
Track pitch: 195 nm
Distance between the magnetic head and the magnetic recording medium: 15 nm There was obtained an S/N ratio of 20.5 dB. This value is high enough for the magnetic recording medium to have a recording density in excess of 50 Gbit/in$^2$.

Then, the sample was examined for the rate of decrease of the read output with time. The rate of decrease was 2% when the read output was measured 100 hours after recording with a linear recording density of 100 kFCI. This suggests that the sample will retain recorded data for a long period of time owing to its good thermal stability.

[Effect of the invention] The magnetic recording medium of the present invention has a high coercive force and good resistance to thermal decay. Moreover, it will realize a magnetic recording apparatus having a recording density in excess of 50 Gbit/in$^2$ when it is used in combination with a magnetic head having a high magneto-resistive effect.

What is claimed is:

1. A method for producing a perpendicular magnetic recording medium, comprising:
    a step of forming a cobalt-containing magnetic layer directly or with an intervention of an underlayer on a substrate,
    a first step of heating said magnetic layer,
    a step of forming a protective layer on said magnetic layer, and
    a second step of heating the thus formed layers under atmospheric pressure after the formation of said protective layer, wherein
    said second step of heating is carried out with a heating temperature no higher than 250° C. in order to increase coercivity and reduce stacking fault density of the magnetic recording medium.

2. A method for producing a perpendicular magnetic recording medium according to claim 1, further comprising:
    a step of forming a non-magnetic layer with hexagonal closed-packed (hcp) structure before the formation of said magnetic layer.

3. A method for producing a perpendicular magnetic recording medium according to claim 1, wherein said step of forming a protective layer on said magnetic layer comprises forming said protective layer of a carbonaceous material.

* * * * *